United States Patent [19]
Shimada et al.

[11] 3,884,911
[45] May 20, 1975

[54] DERIVATIVES OF BERBERINE

[75] Inventors: Fumitaka Shimada, Iwatsuki; Tetsuro Ikekawa, Narashino; Tomio Endo, Kobe; Hideo Kuroda, Urawa; Yoshiaki Ikeda, Tokyo; Kooichi Tachibana, Ohmiya; Yoshimi Okazaki, Tokyo, all of Japan

[73] Assignees: Kanebo, Ltd., Tokyo; Tetsuro Ikekawa, Chiba, both of Japan

[22] Filed: Aug. 22, 1973

[21] Appl. No.: 390,402

[30] Foreign Application Priority Data
Aug. 25, 1972 Japan.............................. 47-85651

[52] U.S. Cl. ......... 260/240 J; 424/258; 260/286 Q; 260/289 A
[51] Int. Cl............................................ C07d 35/28
[58] Field of Search .................................. 260/240 J

[56] References Cited
OTHER PUBLICATIONS
Shamma et al., J. Am. Chem. Soc., Vol. 92, pp. 4943 to 4949 (1970).

Sun et al., Chemical Abstracts, Vol. 63, Col. 7062 (1965), (abst. of original in Yao Hseuh Hsueh Pao, Vol. 12, pp. 314–318 (1965).
Chemical Abstracts subject index, Vol. 63, P. 473 s (1965).

Primary Examiner—John D. Randolph
Attorney, Agent, or Firm—Millen, Raptes & White

[57] ABSTRACT

Novel derivatives of berberine of the formula:

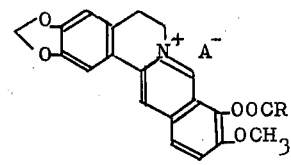

wherein RCO represents a cinnamoyl group which may be substituted with chloro, acetoxy, methoxy or methylenedioxy groups on the benzene ring, and A represents an anion. The compounds inhibit the growth of transplanted sarcoma strain in mice.

6 Claims, No Drawings

DERIVATIVES OF BERBERINE

This invention relates to novel derivatives of berberine of the formula:

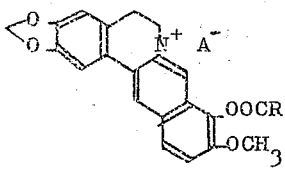

wherein RCO represents a cinnamoyl group which may be substituted with chloro, acetoxy, methoxy or methylenedioxy groups on the benzene ring, and A represents an anion. Furthermore, the present invention relates to a process for preparing the novel compound of the formula I, which comprises reacting berberrubine of the formula:

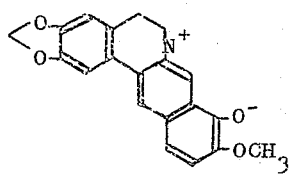

with a functional derivative of a cinnamic acid which may be substituted with chloro, hydroxy, acetoxy, methoxy or methylenedioxy groups on the benzene ring.

According to the present invention, it has been found that berberrubine, which is easily obtainable by heating berberine chloride at about 190°C in an inert medium such as nitrogen, carbon dioxide or liquid paraffin, may be acylated with a functional derivative of cinnamic acid or an appropriately substituted derivative thereof to give the novel derivatives of berberine of the formula I.

As the substituted cinnamic acids, 4-chloro-, 3, 4-dimethoxy-, or 3, 4- methylendioxycinnamic acid, or acetylfelulic acid, namely 4- acetoxy-3- methoxycinnamic acid, may be used.

As the functional derivatives of cinnamic acid or the substituted cinnamic acid, esters such as methyl or ethyl esters, anhydrides, or halides such as chloride, bromide or iodide may be used.

Examples of the anion of A are halides such as chloride, bromide or iodide, or hydroxide ions.

The reaction proceeds at an elevated temperature in a solvent such as chloroform, ethylenechloride or benzene, optionally in the presence of an acid acceptor such as pyridine, piperazine, quinoline or other tertiary amines.

According to the process as described above, for example, the following final products may be obtained:
9-demethyl-9-cinnamoylberberine chloride,
9-demethyl-9-acetylfeluloyberberine chloride,
9-demethyl-9-(4'-chlorocinnamoyl) berberine chloride,
9-demethyl-9-(3',4'-dimethoxycinnamoyl) berberine chloride,
and 9-demethyl-9-(3', 4'-methylenedioxycinnamoyl) berberine chloride.

Throughout the specification and claims, it should be understood that the nomenclature of 9-demethylberberine represents berberines with a methyl group removed from the methoxy group at the 9-position.

The novel compounds of the present invention effectively inhibit the growth of transplanted sarcoma in mice.

For example, sarcoma strain 180 was transplanted to peritoneum of mice and the test compound was administered intraperitoneally to mice once a day for 5 consecutive days. After one week abdominal ascites was collected and the total volume of sarcoma cells was compared with that of control.

In the above test, 9-demethyl-9-cinnamoylberberine chloride showed a inhibition rate of 95 percent upon 5 administrations thereof at a dose of 30mg/kg/day and 9-demethyl-9-acetylfeluloylberberine chloride showed a inhibition rate of 90 percent at a dose of 25mg/kg/day.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Example 1

15g of berberrubine was dissolved in a mixture of 800ml of chloroform and 30ml of pyridine under heating. To this solution was added dropwise 10g of cinnamoyl chloride in 100ml of chloroform. The mixture was refluxed for 4 hours and cooled, and the resulting crystals were collected and recrystallized from ethanol. 8.2g of 9-demethyl-9-cinnamoylberberine chloride melting at 212–214°C with decomposition was obtained. The product showed a single spot at an Rf=0.17 on thin layer chromatography thereof (Silica gel G, methanol: water=3:1), and an absorption of $\nu$ C=0 1750cm$^{-1}$ in the infra-red absorption spectrum.

Example 2

10g of berberrubine was dissolved in a mixture of 350ml of chloroform and 26ml of pyridine under heating. To this solution was added dropwise 10g of acetylfeluloyl chloride in 100ml of chloroform. The mixture was refluxed for 5 hours and cooled, and the resulting crystals were collected and recrystallized from ethanol. 5.3g of yellow needles of 9-demethyl-9-acetylfeluloylberberine chloride melting at 215–128°C with decomposition was obtained. The product showed a single spot at an Rf=0.20 on the thin layer chromatography thereof (Silica gel G, methanol: water=3:1), and an absorption of $\nu$ C=0 1740cm$^{-1}$ on the infra-red absorption specturm.

Example 3

20g of berberrubine was dissolved in a mixture of 1 l. of chloroform and 50ml. of pyridine under heating and 50ml. of chloroform was distilled off to remove water present in the azeotropic mixture. To the solution was added dropwise 16g of p-chlorocinnamoyl chloride in 100ml. of chloroform. The mixture was refluxed for 2 hours and evaporated to reduce the volume.

Crystals which formed upon cooling were collected and recrystallized from ethanol, whereby 10.5g of yellow needles of 9-demethyl-9-(4'-chlorocinnamoyl) berberine chloride melting at 233–235°C with decomposition was obtained. The product showed a single spot at an Rf=0.15 on thin layer chromatography thereof (Silica gel G, methanol: water=3:1), and an absorption of $\nu$ C=0 1735cm$^{-1}$ in the infra-red absorption spectrum.

Example 4

10g of berberrubine was dissolved in a mixture of 600ml of chloroform and 50ml of pyridine under heating and 50ml of chloroform was distilled off to remove water present in the azeotropic mixture.

To the solution was added dropwise 10g of 3, 4-dimethoxycinnamoyl chloride in 100ml of chloroform. The mixture was refluxed for 2 hours and cooled. The resulting crystals were collected and recrystallized from ethanol, whereby 6.1 g of yellow needles of 9-demethyl-9-(3′,4′-dimethoxycinnamoyl) berberine chloride was obtained. The product showed a single spot at an RF=0.16 on thin layer chromatography thereof (Silica gel G, methanol: water=3:1), and an absorption of $\nu$ C=0 1725 in the infra-red absorption spectrum.

Example 5

10g of berberrubine was dissolved in a mixture of 600ml of chloroform under heating. To this solution was added dropwise 10g of 3, 4-methylenedioxycinnamoyl chloride. The mixture was refluxed for 3 hours and cooled. The resulting crystals were collected and recrystallized from methanol, whereby 12g of yellow crystals of 9-demethyl-9-(3′, 4′-methylenedioxycinnamoyl) berberine chloride was obtained. The product showed a single spot at an Rf=0.16 on thin layer chromatography thereof (Silica gel G, methanol : water=3;1), and an absorption of $\nu$ C=0 1740cm$^{-1}$ in the infra-red absorption spectrum.

Various other examples and modifications of the foregoing examples can be devised by the person skilled in the art after reading the foregoing disclosure and the appended claims without departing from the spirit and scope of the invention. All such further examples and modifications thereof are included within the scope of said claims.

WHAT IS CLAIMED IS:

1. A derivative of berberine of the formula:

wherein RCO represents a cinnamoyl group which may be substituted with chloro, acetoxy, methoxy or methylenedioxy groups on the benzene ring, and A represents an anion.

2. A compound according to claim 1, wherein the RCO group is cinnamoyl and A is chloride.

3. A compound according to claim 1, wherein the RCO group is acetylfeluloyl and A is chloride.

4. A compound according to claim 1, wherein the RCO group is 4-chlorocinnamoyl and A is chloride.

5. A compound according to claim 1, wherein the RCO group is 3, 4-dimethoxycinnamoyl and A is chloride.

6. A compound according to claim 1, wherein the RCO group is 3, 4-methylenedioxycinnamoyl and A is chloride.

* * * * *